(12) United States Patent
Cooper et al.

(10) Patent No.: US 11,247,802 B2
(45) Date of Patent: Feb. 15, 2022

(54) METHOD FOR COUPLING TOGETHER A PLURALITY OF ITEMS AND PLASTIC FASTENER FOR USE THEREWITH

(71) Applicant: Avery Dennison Corporation, Glendale, CA (US)

(72) Inventors: William J. Cooper, Shrewsbury, MA (US); Jay Simard, Holden, MA (US)

(73) Assignee: Avery Dennison Corporation, Glendale, CA (US)

(*) Notice: Subject to any disclaimer, the term of this patent is extended or adjusted under 35 U.S.C. 154(b) by 642 days.

(21) Appl. No.: 15/391,129

(22) Filed: Dec. 27, 2016

(65) Prior Publication Data

US 2018/0178454 A1    Jun. 28, 2018

(51) Int. Cl.
| | | |
|---|---|---|
| *B65C 7/00* | (2006.01) | |
| *G09F 3/14* | (2006.01) | |
| *C09J 7/38* | (2018.01) | |
| *C09J 7/10* | (2018.01) | |
| *G09F 3/03* | (2006.01) | |

(52) U.S. Cl.
CPC .............. B65C 7/003 (2013.01); C09J 7/10 (2018.01); C09J 7/38 (2018.01); G09F 3/037 (2013.01); G09F 3/14 (2013.01); *C09J 2301/302* (2020.08)

(58) Field of Classification Search
None
See application file for complete search history.

(56) References Cited

U.S. PATENT DOCUMENTS

| | | |
|---|---|---|
| 3,733,657 A | 5/1973 | Lankton |
| 4,039,078 A | 8/1977 | Bone |
| 5,120,176 A | 6/1992 | Bhatia et al. |
| 5,656,705 A | 8/1997 | Mallya et al. |
| 6,083,620 A | 7/2000 | Laprade et al. |

(Continued)

FOREIGN PATENT DOCUMENTS

| | | |
|---|---|---|
| JP | 8-305292 | 11/1996 |
| WO | 01/54103 | 7/2001 |

OTHER PUBLICATIONS

International Search Report and Written Opinion dated Sep. 1, 2017 issued in corresponding IA No. PCT/US2016/068687 filed Dec. 27, 2016.

(Continued)

*Primary Examiner* — Frank D Ducheneaux (57) ABSTRACT

A plastic fastener is rendered tacky so as to adhere to the items which it couples, thereby enhancing securement. The plastic fastener is constructed as an H-shaped staple that includes a pair of parallel cross-bars interconnected by a flexible filament. In one embodiment, the plastic fastener includes an inner plastic core constructed using at least one flexible plastic material and an adhesive-based outer coating constructed using at least one of a pressure-sensitive adhesive and a heat-activatable adhesive. In another embodiment, the plastic fastener is constructed using a mixture of at least one flexible plastic material and at least one adhesive material. In lieu of incorporating an adhesive material into the plastic fastener, a novel item coupling process achieves fastener tackiness by applying heat onto the plastic fastener either prior to, during, or after being dispensed into the desired items.

10 Claims, 5 Drawing Sheets

(56) References Cited

U.S. PATENT DOCUMENTS

| | | | |
|---|---|---|---|
| 6,308,386 B1 * | 10/2001 | Cooper | B29C 45/26 24/16 PB |
| 6,315,851 B1 | 11/2001 | Mazurek et al. | |
| 6,328,518 B1 | 12/2001 | Wong | |
| 6,401,304 B1 | 6/2002 | Dossett | |
| 6,423,406 B1 | 7/2002 | Bilodeau | |
| 6,537,651 B2 | 3/2003 | Geurtsen et al. | |
| 7,906,189 B2 | 3/2011 | Tsai et al. | |
| 8,413,866 B2 | 4/2013 | Cooper | |
| 9,499,937 B2 | 11/2016 | He et al. | |
| 2002/0047263 A1 | 4/2002 | McCarthy et al. | |
| 2004/0205940 A1 * | 10/2004 | Cooper | G09F 3/14 24/16 PB |

OTHER PUBLICATIONS

International Preliminary Report on Patentability dated Jul. 2, 2019 issued in corresponding IA No. PCT/US2016/068687 filed Dec. 27, 2016.

* cited by examiner

METHOD FOR COUPLING TOGETHER A PLURALITY OF ITEMS AND PLASTIC FASTENER FOR USE THEREWITH

FIELD OF THE INVENTION

The present invention relates generally to the retail industry and more particularly to plastic fasteners used in the retail industry.

BACKGROUND OF THE INVENTION

Plastic fasteners are commonly utilized in the retail industry in a variety of different applications to couple together two or more separate items. For instance, plastic fasteners are often used to couple together (i) a pair of complementary articles of clothing, such as socks, gloves and the like, (ii) a merchandise tag, or ticket, to one or more articles of clothing (e.g., a merchandise ticket folded over the waistline of a pair of jeans), and (iii) a handheld item (e.g., a tool or toy) to its corresponding packaging (e.g., a screwdriver disposed against the front surface of a flat, cardboard display card).

In U.S. Pat. No. 4,039,078 to A. R. Bone, the disclosure of which is incorporated herein by reference, there are disclosed several different types of plastic fasteners. Each plastic fastener described in the patent is manufactured in a generally H-shaped configuration, with two shortened parallel cross-bars, or T-bars, being interconnected at their appropriate midpoints by a single, thin, flexible filament which extends orthogonally therebetween.

Figure 1:
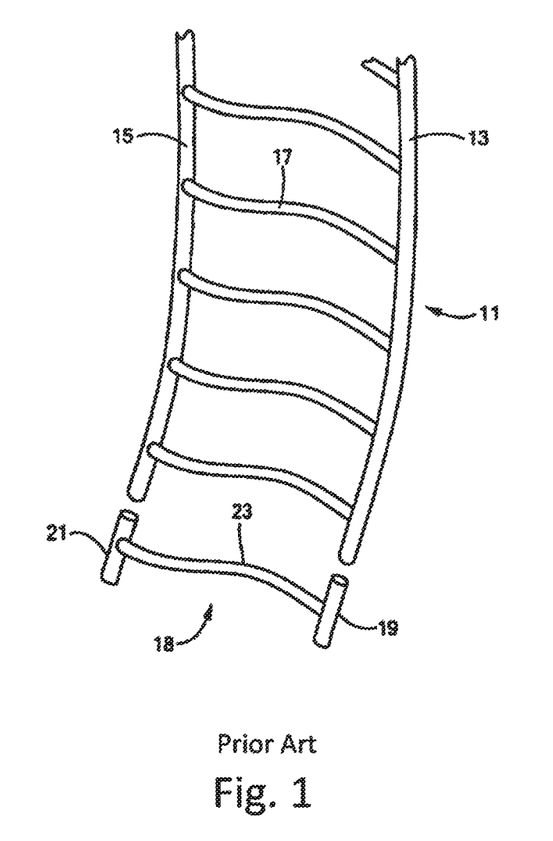
FIG. 1 is a fragmentary, front perspective view of a length of continuously connected ladder stock that is known in the art, the ladder stock being shown with an individual plastic fastener separated therefrom.

Plastic fasteners of the type described above are commonly fabricated as part of a continuously connected supply of fastener stock, which is also commonly referred to in the art simply as ladder stock due to its ladder-like appearance. Referring now to FIG. 1, there is shown a length of ladder stock that is presently manufactured and sold by Avery Dennison Corporation of Pasadena, Calif. under the PLASTIC STAPLE® and ELASTIC STAPLE™ lines of plastic fasteners. As can be seen, a length of ladder stock is shown, the ladder stock being identified generally by reference numeral 11. Ladder stock 11 comprises a pair of elongated and continuous side members, or rails, 13 and 15 which are interconnected by a plurality of equidistantly spaced cross-links 17.

An individual plastic fastener 18 is obtained from ladder stock 11 by severing side members 13 and 15 at the approximate midpoint between successive cross-links 17. As can be seen, each fastener 18 comprises a pair of cross-bars 19 and 21 which are interconnected by a thin, flexible filament 23, with cross-bars 19 and 21 comprising sections of side members 13 and 15, respectively, and filament 23 comprising a cross-link 17.

Automated plastic fastener dispensing devices, or machines, are well known in the art and are commonly used to dispense individual plastic fasteners from a reel of ladder-type fastener stock. For example, in U.S. Pat. No. 8,413,866 to W. J. Cooper et al., the disclosure of which is incorporated herein by reference, there is disclosed one well known type of plastic fastener dispensing device that is presently manufactured and sold by Avery Dennison Corporation of Pasadena, Calif. as the ST9500® fastener system, the fastener dispensing device being shown in FIG. 2 and identified therein by reference numeral 30. As can be seen, fastener dispensing device 30 is designed to dispense individual plastic fasteners from a reel of continuously-connected ladder stock 11.

Figure 2:
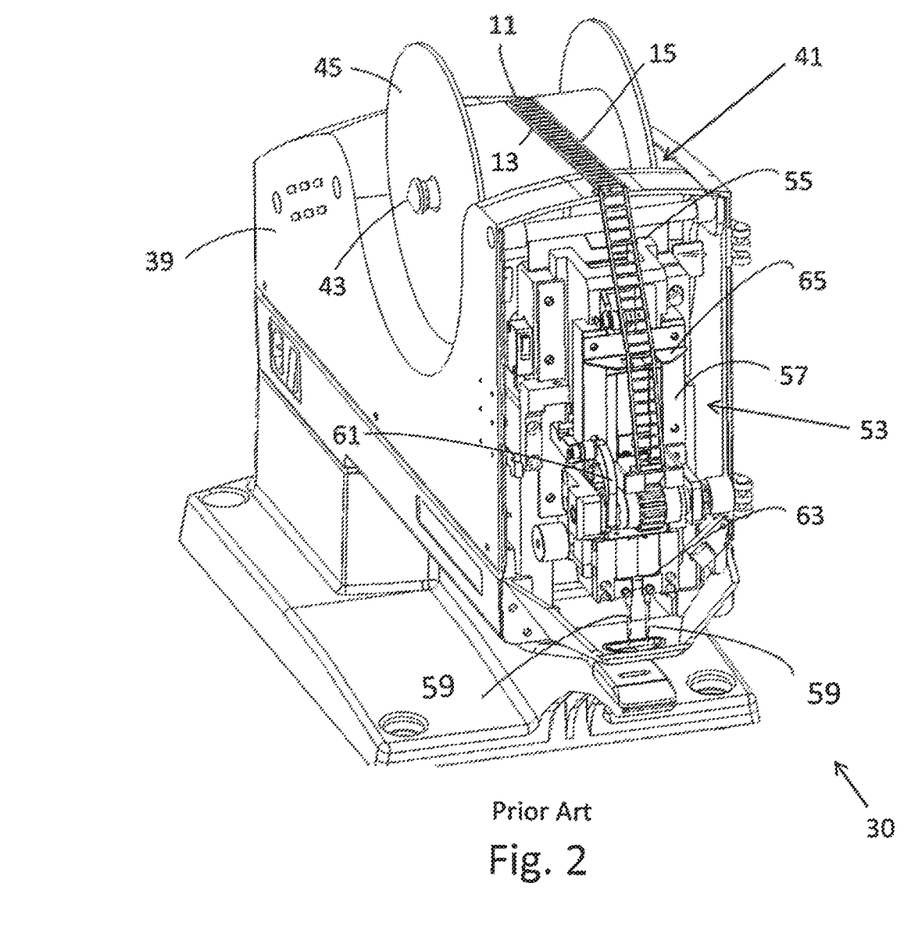
FIG. 2 is a front perspective view of a fastener dispensing device that is known in the art, the fastener dispensing device being shown with a length of the fastener stock in FIG. 1 fed thereinto, the fastener dispensing device being shown with a portion of its housing removed therefrom.

Fastener dispensing device, or machine, 30 comprises a substantially enclosed, protective housing 39 that serves to protect the majority of the electrical and mechanical components in device 30. An arcuate recess 41 is formed in the top surface of housing 39. A cylindrical reel holder 43, which is mounted onto housing 39, extends laterally through recess 41 and is dimensioned to pass axially through a longitudinal bore formed in a reel, or spool, 45 around which ladder stock 11 is wound. Accordingly, holder 43 serves to support reel 45 within recess 41 and enable reel 45 to rotate freely during normal operation, thereby rendering device 10 capable of continuously dispensing plastic fasteners in an automated fashion.

Fastener dispensing device 30 additionally includes a motor-driven head assembly 53 that is disposed within the front end of protective housing 39 and is responsible for, inter alia, dispensing an individual fastener 18 from ladder stock 11. Specifically, head assembly 53 includes a vertically extending mount 55 that is fixedly retained in place, mount 55 being generally U-shaped in lateral cross-section. A motor-driven, vertically displaceable head 57 is slidably coupled to mount 55 for purposes to become apparent below.

Head assembly 53 comprises a pair of hollow, slotted needles (each shown as 59) that is fixedly coupled to vertically displaceable head 57 and is therefore adapted to selectively penetrate through the one or more items to be fastened, a feed mechanism 61 for advancing side members 13 and 15 of ladder stock 11 into axial alignment behind the longitudinal bores defined by needles 59, respectively, a severing mechanism 63 for cutting side members 13 and 15 of ladder stock 11 at the approximate midpoint between successive cross-links 17 to separate an individual plastic fastener 18 from the remainder of ladder stock 11, and an ejection mechanism 65 for ejecting cross-bars 19 and 21 of the severed fastener 18 through the bores of the pair of hollowed needles 59 and, in turn, through the one or more items previously penetrated by needles 59.

Conventional plastic fasteners, such as prior art fastener 18, are commonly constructed using one or more flexible plastic materials, such as nylon, polypropylene and polyurethane. This selection of plastic materials, as well the particular method of its manufacture, typically yields a plastic fastener with a relatively low coefficient of friction. As can be appreciated, the creation of a plastic fastener with a low coefficient of friction has been traditionally regarded as providing certain benefits, such as ease in handling, packaging and dispensing.

At the same time, the relatively smooth and non-tacky nature of traditional fasteners, such as prior art fastener 18, has been found to limit its reliability and overall effectiveness in securing together two or more intended articles. For instance, a traditional plastic fastener can be used to couple an article of commerce to its intended packaging. However, because the fastener has a low coefficient of friction, the article is often able to slide, or otherwise move, slightly relative to its packaging.

It has been found that even limited displacement of an article relative to its packaging can result in potential damage to the article and/or a reduced aesthetic component. Furthermore, the ability to repeatedly move an article relative to its packaging can be utilized by an unscrupulous individual to permanently disassociate the article from its packaging.

SUMMARY OF THE INVENTION

It is an object of the present invention to provide a new and improved plastic fastener for coupling together two or more intended items.

It is another object of the present invention to provide a plastic fastener as described above that couples together the two or more intended items in a secure manner.

It is yet another object of the present invention to provide a plastic fastener as described above that limits movement between the two or more intended items which it couples together.

It is still another object of the present invention to provide a plastic fastener as described above that can be mass produced, is inexpensive to manufacture, and is easy to use.

It is yet still another object of the present invention to provide a novel method for coupling together two or more intended items.

It is another object of the present invention to provide a method as described above that couples together the two or more intended items in a secure manner.

It is yet another object of the present invention to provide a method as described above that limits movement between the two or more intended items coupled together.

Accordingly, as one feature of the present invention, there is provided a plastic fastener, comprising (a) a flexible filament having a first end and a second end, and (b) a first enlargement disposed at the first end of the flexible filament, (c) wherein at least one of the flexible filament and the first enlargement comprises an adhesive material.

As another feature of the present invention, there is provided a method for coupling together a plurality of items, the method comprising the steps of (a) providing a plastic fastener, the plastic fastener comprising a flexible filament having a first end and a second end, and a first enlargement disposed at the first end of the flexible filament, (b) dispensing the plastic fastener into the plurality of items, and (c) treating the plastic fastener until tacky.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE INVENTION

Adhesive-Coated Plastic Fastener 111

Figure 3A:
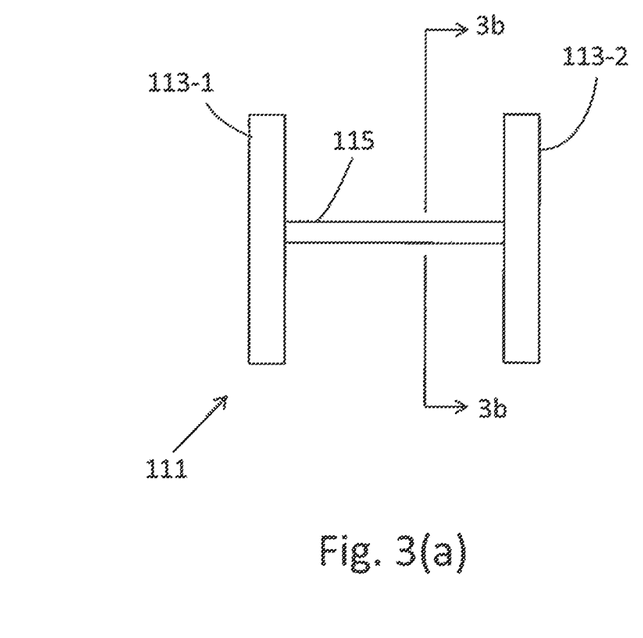
FIG. 3(a) is a front view of a first embodiment of a novel plastic fastener constructed according to the teachings of the present invention.
Figure 3B:
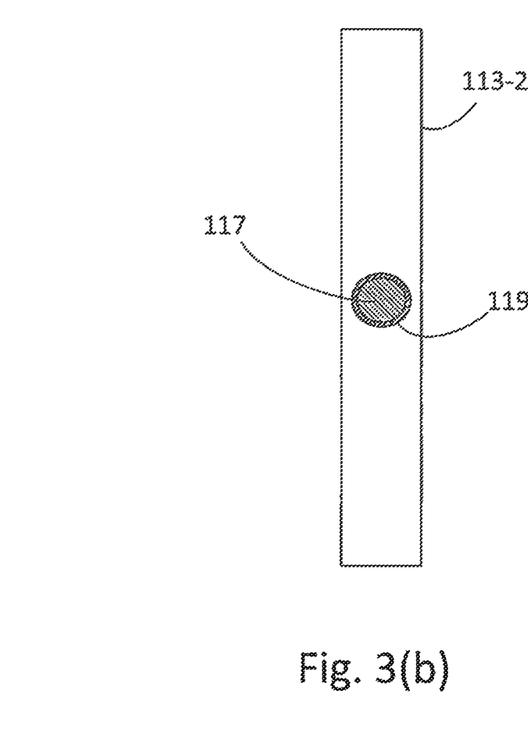
FIG. 3(b) is an enlarged section view of the plastic fastener shown in FIG. 3(b), taken along lines 3b-3b.

Referring now to FIGS. 3(a) and 3(b), there are shown front and section views, respectively, of a first embodiment of a novel plastic fastener constructed according to the teachings of the present invention, the fastener being identified generally by reference numeral 111. As will be explained in detail below, plastic fastener 111 is specifically designed to exhibit a certain level of tackiness, or stickiness. Accordingly, plastic fastener 111 is adapted to adhere to the articles to which it is applied, thereby providing an enhanced level of article securement, which is a principal object of the present invention.

As seen in FIG. 3(a), fastener 111 is represented herein with the same general configuration as prior art fastener 18. Specifically, plastic fastener 111 is represented herein as an H-shaped staple that includes a pair of parallel cross-bars 113-1 and 113-2 which are interconnected at their approximate midpoints by a thin, flexible filament 115.

However, it should be noted that fastener 111 is not limited to the particular configuration as shown herein. Rather, it is to be understood that fastener 111 could be formed in alternative configurations without departing from the spirit of the present invention.

For instance, the relative lengths and/or cross-sectional shape of cross-bars 113 and filament 115 could be modified to suit the needs of a particular application. Notably, one of cross-bars 113 could be alternatively configured as flattened paddle or other enlargement that renders the fastener suitable for use in merchandise, or price, tagging applications.

As seen most clearly in FIG. 3(b), fastener 111 differs primarily from prior art fastener 18 in that fastener 111 is constructed as comprising an inner plastic core 117 onto which is applied an outer adhesive-based coating 119.

In the present embodiment, outer coating 119 is deposited only onto inner plastic core 117 of filament 115 (e.g. by masking each cross-bar 113 during the adhesive application process). However, it is to be understood that outer coating 119 could be applied onto any portion of fastener 111 (e.g., a limited section or surface of filament 115) without departing from the spirit of the present invention.

Inner core 117 is preferably constructed from one or more flexible plastic materials. For instance, inner core 117 may be formed of any materials used in conventional plastic fasteners, such as nylon, polypropylene, polyurethane, or a composite thereof.

Preferably, outer coating 119 comprises one or more adhesive materials. The one or more adhesive materials may comprise one or more pressure-sensitive adhesives and/or one or more hot-melt or heat-activatable adhesives.

The one or more pressure-sensitive adhesives may include removable pressure-sensitive adhesives and/or ultraremovable pressure-sensitive adhesives. Such adhesives may comprise an acrylate polymer, a vinyl acrylate polymer, a styrene block copolymer, or combinations thereof. Examples of removable and/or ultraremovable pressure-sensitive adhesives that may be suitable for use in outer coating 119 may be discussed in the following patents and patent publications, all of which are incorporated herein by reference: U.S. Pat. No. 6,328,518, inventor Wong, issued Dec. 11, 2001; U.S. Pat. No. 6,315,851, inventors Mazurek et al., issued Nov. 13, 2001; U.S. Pat. No. 5,656,705, inventors Mallya et al., issued Aug. 12, 1997; and U.S. Patent Application Publication No. US 2002/0047263 A1, inventors McCarthy et al., published Apr. 25, 2002.

The one or more hot-melt or heat-activatable adhesives may comprise an ethylene-vinyl acetate copolymer, a polyolefin polymer, a polyamide polymer, a polyester polymer, a polyurethane polymer, a polyacrylate polymer, a styrene block copolymer or combinations thereof. Examples of hot-melt adhesives and/or heat-activatable adhesives that may be suitable for use in outer coating 119 may be discussed in the following patents, all of which are incorporated herein by reference: U.S. Pat. No. 9,499,937, inventors He et al., issued Nov. 22, 2016; U.S. Pat. No. 7,906,189, inventors Tsai et al., issued Mar. 15, 2011; U.S. Pat. No. 6,537,651, inventors Geurtsen et al., issued Mar. 25, 2003; U.S. Pat. No. 6,423,406, inventor Bilodeau, issued Jul. 23, 2002, U.S. Pat. No. 6,083,620, inventors LaPrade et al., issued Jul. 4, 2000; and U.S. Pat. No. 5,120,176; inventors Bhatia et al., issued Jun. 9, 1992.

The one or more adhesive materials used to form outer coating 119 should be compatible with (i.e., chemically inert to and adherent with) the material used to form inner plastic core 117.

As part of the present invention, the adhesive properties of outer coating 119 can be inherent upon initial manufacture of plastic fastener 111 or triggered through a designated activation process (e.g., through the application of heat of a specified temperature for a particular duration).

Once the adhesive material is active, outer coating 119 is designed to exhibit a certain level of tackiness. The adhesive properties of outer coating 119 causes plastic fastener 111 to stick to the items to which it is applied, thereby resulting in an increase in the quality of securement between the coupled items.

In use, fastener 111 is preferably designed to be dispensed using an appropriate fastener dispensing device, such as prior art machine 30. Using such a device, one or more hollow slotted needles, such as needles 59, are mechanically driven through the intended items. Upon penetration of the items, a cross-bar 113 is ejected through each needle. Thereafter, each cross-bar 113 resiliently orients itself back into an orthogonal relationship relative to filament 115 within their region of interconnection.

Based on the intended application, cross-bars 113 typically lie flat against either the same or opposing external surfaces of the coupled items. As a result of the dispensing process, filament 115 is typically maintained taut between cross-bars 113 and often conforms tightly against at least one of the coupled items.

Due to the tackiness of outer coating 119, this region of contact between fastener 111 and the items to which it is secured experiences a notable increase in frictional forces. As a result, this frictional engagement serves to strengthen the retentive force established between the coupled items and thereby limit movement therebetween.

As referenced above, if the tackiness of adhesive coating 119 is active upon initial manufacture of fastener 111, the dispensing of fastener 111 into the desired items serves to immediately couple the items together with the requisite degree of securement. However, if the tackiness of adhesive coating 119 requires a specific activation step (e.g. the application of heat), it is understood that such activation may occur at any point prior to, during, or subsequent to the fastener dispensing process.

The construction of fastener 111 as described above is intended to be merely exemplary and those skilled in the art shall be able to make numerous variations and modifications to it without departing from the spirit of the present invention. All such variations and modifications are intended to be within the scope of the present invention as defined in the appended claims.

Adhesive-Based Plastic Fastener 211

Figure 4A:
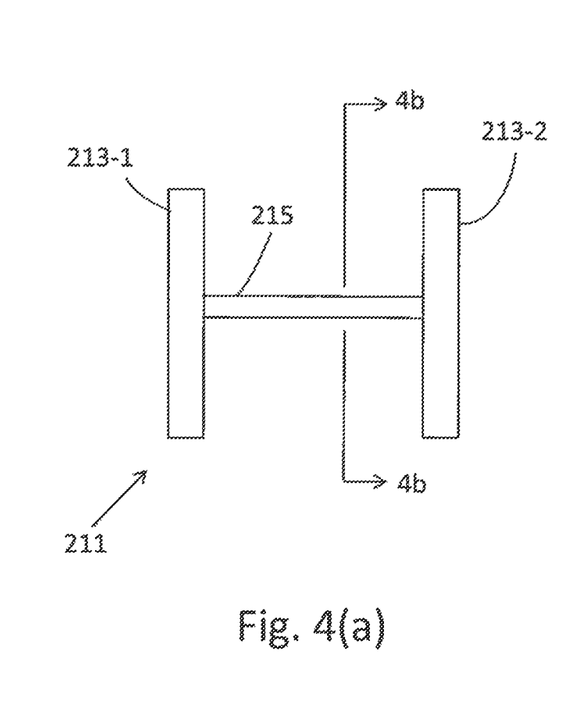
FIG. 4(a) is a front view of a second embodiment of a novel plastic fastener constructed according to the teachings of the present invention.
Figure 4B:
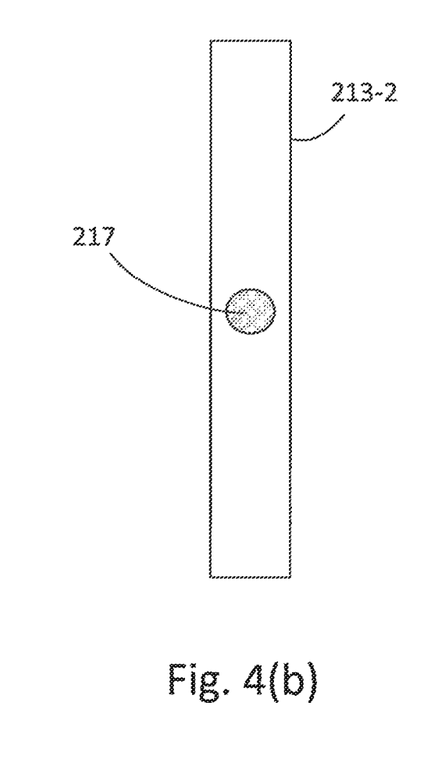
FIG. 4(b) is an enlarged section view of the plastic fastener shown in FIG. 4(a), taken along lines 4b-4b.

Referring now to FIGS. 4(a) and 4(b), there are shown front and section views, respectively, of a second embodiment of a novel plastic fastener constructed according to the teachings of the present invention, the fastener being identified generally by reference numeral 211. As will be explained in detail below, plastic fastener 211 is similar to fastener 111 in that fastener 211 is specifically designed to exhibit a certain level of tackiness, or stickiness, in order to provide an enhanced level of article securement, which is a principal object of the present invention.

As seen in FIG. 4(a), fastener 211 is represented herein with the same general configuration as plastic fastener 111. Specifically, plastic fastener 211 is represented herein as an H-shaped staple that includes a pair of parallel cross-bars 213-1 and 213-2 which are interconnected at their approximate midpoints by a thin, flexible filament 215.

However, as with fastener 111, it should be noted that fastener 211 is not limited to the particular configuration as shown herein. Rather, it is to be understood that fastener 211 could be formed in alternative configurations without departing from the spirit of the present invention.

For instance, the relative lengths and/or cross-sectional shape of cross-bars 213 and filament 215 could be modified to suit the needs of a particular application. Notably, one of cross-bars 213 could be alternatively configured as flattened paddle or other enlargement that renders the fastener suitable for use in merchandise, or price, tagging applications.

As seen most clearly in FIG. 4(b), fastener 211 differs primarily from plastic fastener 111 in that, rather than utilizing an adhesive-based outer coating, fastener 211 simply includes a plastic core 217 with adhesive properties. Specifically, plastic core 217 is preferably constructed of a mixture of (a) one or more flexible plastic materials, such as nylon, polypropylene, polyurethane, or a composite thereof, and (b) one or more adhesive materials. The one or more adhesive materials may comprise one or more pressure-sensitive adhesives and/or one or more hot-melt or heat-activatable adhesives.

The one or more pressure-sensitive adhesives may include removable pressure-sensitive adhesives and/or ultraremovable pressure-sensitive adhesives. Such adhesives may comprise an acrylate polymer, a vinyl acrylate polymer, a styrene block copolymer, or combinations thereof. Examples of removable and/or ultraremovable pressure-sensitive adhesives that may be suitable for use in outer coating 119 may be discussed in the following patents and patent publications, all of which are incorporated herein by reference: U.S. Pat. No. 6,328,518, inventor Wong, issued Dec. 11, 2001; U.S. Pat. No. 6,315,851, inventors Mazurek et al., issued Nov. 13, 2001; U.S. Pat. No. 5,656,705, inventors Mallya et al., issued Aug. 12, 1997; and U.S. Patent Application Publication No. US 2002/0047263 A1, inventors McCarthy et al., published Apr. 25, 2002.

The one or more hot-melt or heat-activatable adhesives may comprise an ethylene-vinyl acetate copolymer, a polyolefin polymer, a polyamide polymer, a polyester polymer, a polyurethane polymer, a polyacrylate polymer, a styrene block copolymer or combinations thereof. Examples of hot-melt adhesives and/or heat-activatable adhesives that may be suitable for use in outer coating 119 may be discussed in the following patents, all of which are incorporated herein by reference: U.S. Pat. No. 9,499,937, inventors He et al., issued Nov. 22, 2016; U.S. Pat. No. 7,906,189, inventors Tsai et al., issued Mar. 15, 2011; U.S. Pat. No. 6,537,651, inventors Geurtsen et al., issued Mar. 25, 2003; U.S. Pat. No. 6,423,406, inventor Bilodeau, issued Jul. 23, 2002, U.S. Pat. No. 6,083,620, inventors LaPrade et al., issued Jul. 4, 2000; and U.S. Pat. No. 5,120,176; inventors Bhatia et al., issued Jun. 9, 1992.

In the present embodiment, adhesive-based core 217 is only utilized to construct filament 215 of plastic fastener 211, with the remainder of fastener 211 (i.e., cross-bars 213) being constructed using one or more flexible plastic materials (i.e., in the absence of an adhesive material). However, it is to be understood that adhesive-based core 217 could be utilized in the construction of any portion of plastic fastener 211 (e.g., a limited segment of filament 215 and/or one cross-bar 213, with the remainder of fastener 211 being formed of a flexible plastic mixture without adhesive properties (e.g., to facilitate fastener dispensing via hollow needles).

As with plastic fastener 111, the adhesive properties of plastic fastener 211 can be either inherent upon initial manufacture or triggered through a designated activation process (e.g., through the application of a requisite degree of heat or pressure). Once the adhesive properties of plastic fastener 211 are active, fastener 211 is adapted to stick to the items to which it is applied, thereby resulting in an increase in the quality of securement between the coupled items.

Method of Coupling Items Using a Plastic Fastener

In lieu of incorporating an adhesive material into a plastic fastener, as represented in detail above, a conventional plastic fastener consisting of one or more flexible plastic materials, such as prior art 18, may be treated in a particular manner to achieve the desired level of tackiness. More specifically, using a novel item coupling process to be described in detail below, a conventional plastic fastener formed without the use of an adhesive is preferably heated, at a designated temperature for a specific duration, so that the fastener exhibits tackiness while, at the same time, retains its general shape and rigidity.

Figure 5:
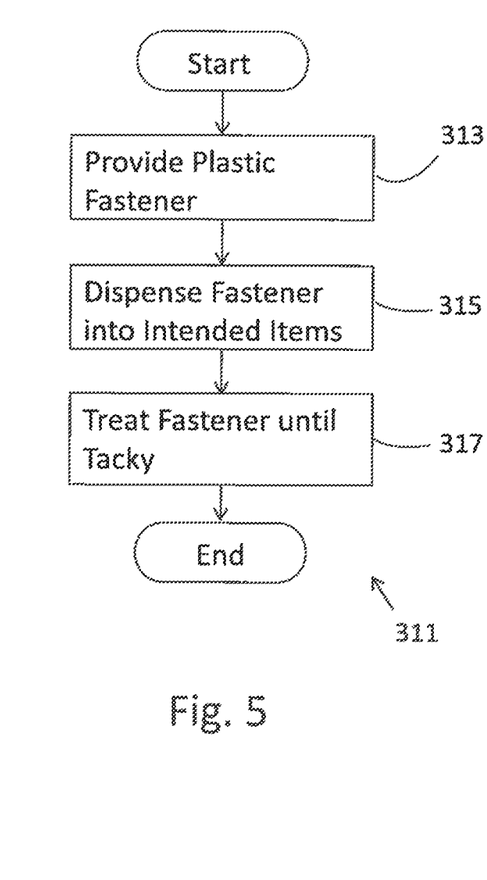
FIG. 5 is a flow chart depicting a first method for coupling together two or more intended items using a plastic fastener of the type shown in FIG. 1, the method being taught in accordance with the teachings of the present invention.

Referring now to FIG. 5, there is shown a first item coupling method that is taught in accordance with the teachings of the present invention, the method being identified generally by reference numeral 311. As can be seen, method 311 commences upon obtaining, or providing, a plastic fastener, the providing step being represented by reference numeral 313.

It should be noted that the plastic fastener obtained in step 313 represents any type of plastic fastener, such as prior art fastener 18. For ease in repeated use, the plastic fastener provided in step 313 is preferably obtained from a supply of ladder stock, such as prior art ladder stock 11.

Upon completion of step 313, the plastic fastener is dispensed into two or more intended items during fastener dispensing step 315. As a result of step 315, the intended items are coupled together by the plastic fastener.

It should be noted that fastener dispensing step 315 can be accomplished using any useful fastener dispensing device. For instance, an H-shaped plastic fastener (e.g., prior art fastener 18) can be automatically dispensed using a two-needle fastener dispensing machine (e.g., prior art machine 30).

With the intended items coupled by a fastener in the manner set forth above, the plastic fastener is then treated until tacky in fastener treatment step 317. For instance, the plastic fastener may be heated, at a designated temperature for a specific period of time, until the fastener exhibits tackiness while, at the same time, retains its general shape and rigidity. As referenced above, once tacky, the plastic fastener frictionally engages the items to which it is coupled, thereby enhancing the strength of item securement.

It is to be understood that step 317 may be achieved using any device that is capable of delivering a supply of heat. If the device is able to deliver a focused, or directed, supply of heat, a limited portion of the fastener (e.g., filament 23 only) may be rendered tacky.

In method 311, fastener treatment step 317 is undertaken after fastener dispensing step 315. However, it is to be understood that fastener treatment step 317 could be undertaken at any time prior to, during, or subsequent to the fastener dispensing process without departing from the spirit of the present invention.

Figure 6:
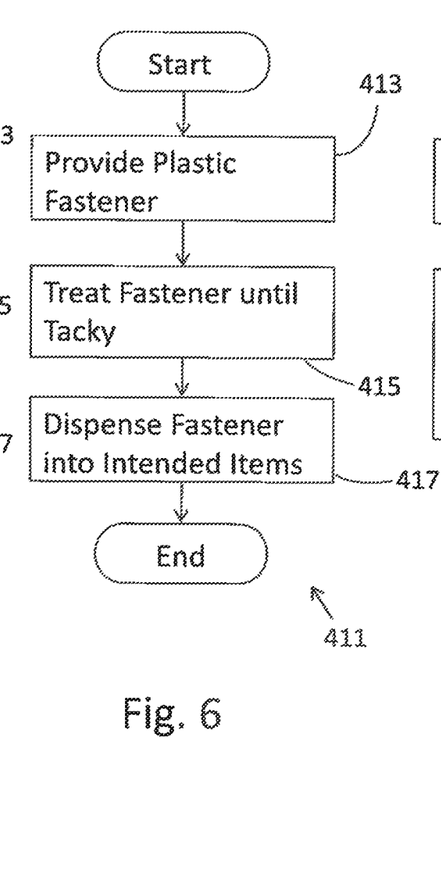
FIG. 6 is a flow chart depicting a second method for coupling together two or more intended items using a plastic fastener of the type shown in FIG. 1, the method being taught in accordance with the teachings of the present invention.

For instance, referring now to FIG. 6, there is shown a second item coupling method which is taught in accordance with the teachings of the present invention, the method being identified generally by reference numeral 411. As can be seen, method 411 is similar to method 311 in that method 411 commences upon obtaining, or providing, a plastic fastener, the providing step being represented by reference numeral 413.

Method 411 differs from method 311 in that method 411 treats the plastic fastener until tacky prior to dispensing, the fastener treatment step being identified generally by reference numeral 415. For instance, the plastic fastener may be heated, at a designated temperature for a specific period of time, until the fastener exhibits tackiness while, at the same time, retains its general shape and rigidity.

Once rendered tacky in step 415, the plastic fastener is then dispensed into two or more items during a fastener dispensing step 417. As a result of fastener dispensing step 417, the intended items are coupled together by the plastic fastener with a suitable retentive force.

It should be noted that fastener dispensing step 417 can be accomplished using any useful fastener dispensing device. For instance, an H-shaped plastic fastener (e.g., prior art fastener 18) can be automatically dispensed using a two-needle fastener dispensing machine (e.g., prior art machine 30). Preferably, the cross-bars of the plastic fastener are not rendered tacky during fastener treatment step 415 (e.g., using a mask) in order to enable each cross-bar to travel easily through its corresponding hollow needle during the fastener ejection process.

Figure 7:
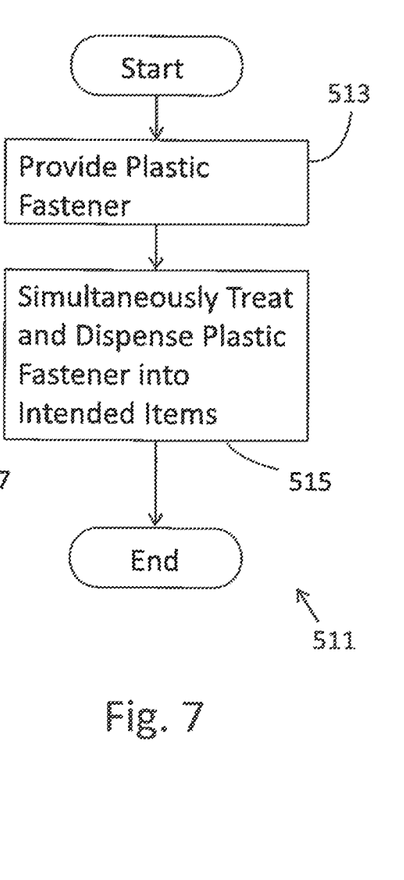
FIG. 7 is a flow chart depicting a third method for coupling together two or more intended items using a plastic fastener of the type shown in FIG. 1, the method being taught in accordance with the teachings of the present invention.

Referring now to FIG. 7, there is shown a third item coupling method that is taught in accordance with the teachings of the present invention, the method being identified generally by reference numeral 511. As can be seen, method 511 is similar to method 311 in that method 511 commences upon obtaining, or providing, a plastic fastener, the providing step being represented by reference numeral 513.

Method 511 differs from method 311 in that method 511 simultaneously treats and dispenses the plastic fastener in step 515 in a near simultaneous fashion. In other words, a fastener dispensing machine is preferably equipped with a heating device that delivers a supply of heat that is capable of rendering at least a portion of the plastic fastener tacky. The heat delivered by the heating device can be applied to the fastener through direct contact (e.g., against a heated platen) or without direct contact (e.g., from a focused hot air blower). As suggested previously above, the heating device preferably renders only the fastener filament tacky in order to enable each cross-bar to travel easily through its corresponding hollow needle during the fastener ejection process.

The methods described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A plastic fastener, comprising:
   (a) a flexible filament having a first end and a second end; and
   (b) a first enlargement disposed at the first end of the flexible filament;
   (c) wherein the flexible filament comprises:
      (a) an inner plastic core; and
      (b) an outer coating comprising one or more adhesive materials;
   wherein the outer coating comprising one or more adhesive materials is deposited onto the inner plastic core of the flexible filament.

2. The plastic fastener of claim 1 wherein the inner plastic core comprises one or more flexible plastic materials.

3. The plastic fastener of claim 2 wherein the inner plastic core is constructed using at least one material from the group consisting of nylon, polypropylene, and polyurethane.

4. The plastic fastener of claim 1 wherein the adhesive material is constructed using at least one material from the group consisting of at least one pressure-sensitive adhesive and a least one heat-activatable adhesive.

5. The plastic fastener of claim 1 wherein at least one of the flexible filament and the first enlargement is constructed of a mixture comprising:
   (a) at least one flexible plastic material; and
   (b) at least one adhesive material.

6. The plastic fastener of claim 5 wherein the at least one plastic material is constructed using at least one material from the group consisting of nylon, polypropylene, and polyurethane.

7. The plastic fastener of claim 5 wherein the at least one adhesive material is constructed using at least one material from the group consisting of at least one pressure-sensitive adhesive and a least one heat-activatable adhesive.

8. The plastic fastener of claim 1 wherein the first enlargement is a cross-bar.

9. The plastic fastener of claim 8 further comprising a second enlargement disposed at the second end of the flexible filament.

10. The plastic fastener of claim 9 wherein the second enlargement is a cross-bar.

* * * * *